Jan. 27, 1942. D. K. LIPPINCOTT ET AL 2,271,142
FLUID-SPEED METER
Filed May 23, 1938 2 Sheets-Sheet 2
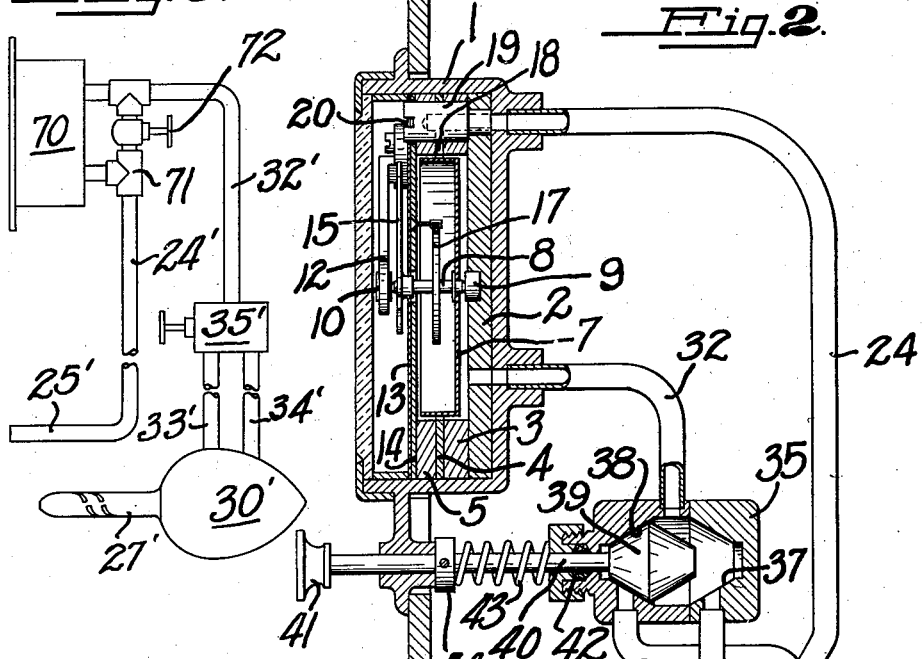
INVENTORS.
DONALD K. LIPPINCOTT.
MORRIS C. WHITE.
BY
Lippincott & Metcalf
ATTORNEYS.

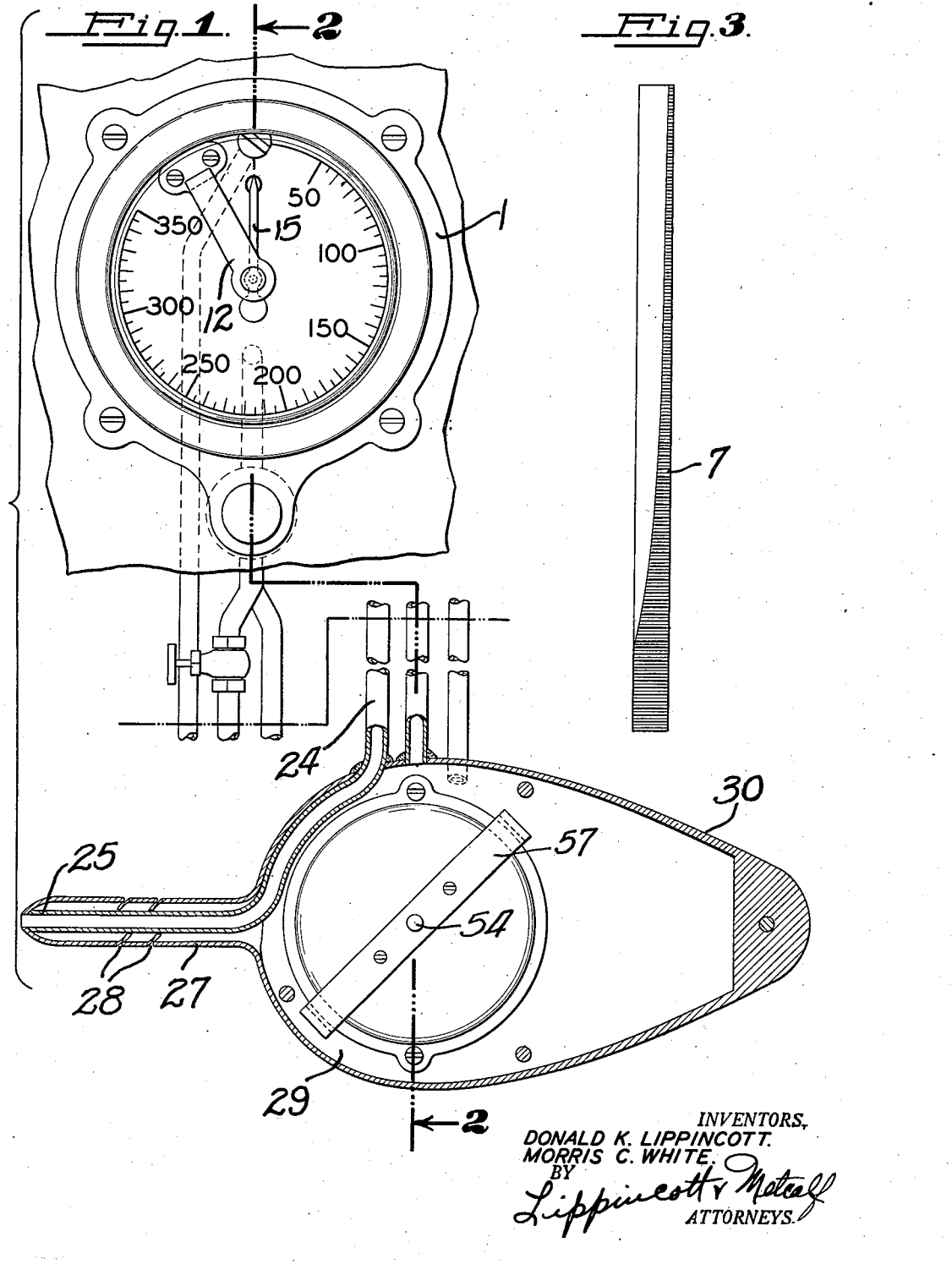

Patented Jan. 27, 1942

2,271,142

UNITED STATES PATENT OFFICE 2,271,142

FLUID-SPEED METER

Donald K. Lippincott and Morris C. White, San Francisco, Calif.

Application May 23, 1938, Serial No. 209,542

12 Claims. (Cl. 73—205)

This invention relates to fluid velocity meters, and particularly to air-speed meters such as are used in the operation of aircraft.

Air-speed meters as customarily used comprise some type of pressure gage or indicating element, together with some arrangement for applying across this element a "velocity head" due to the speed of the aircraft through the air. Neglecting certain correction factors, which will be discussed in detail later, the velocity head is proportional to the density of the air times the square of the velocity. Since the density of the air changes both with change of temperature and change of pressure, a meter of this character will read correctly only when the air density is that for which it was calibrated. Since, however, the lift or supporting power of an air-foil varies with density and speed in the same manner as does the indication of such meters, this is a valuable property for the stalling speed of an aeroplane will always be at the same indicated air-speed, irrespective of the height at which the plane is flying, the density of the air, and the actual speed of the plane. One of the objects of our invention is accordingly to provide a meter which normally reads in "indicated air-speed" in the same manner as do meters of conventional type.

For navigational purposes, however, it is necessary to apply to readings of "indicated air-speed" a correction for pressure and a correction for temperature, these being the two factors which primarily affect air density. Charts and computing devices of various types are used in order to derive true air-speed from indicated speed, but the duties imposed upon a pilot of a modern plane are so severe as to make undesirable even the simplest computation if such computation can be avoided. Another object of this invention is therefore to provide a meter which will, when desired by the pilot, read directly in true air-speed.

Since maintaining a safe flying speed is of paramount importance at all times, a further object of this invention is to provide a meter in which the change from indicated air-speed readings to true air-speed readings is accomplished by the simplest possible manipulation on the part of the pilot (e. g., pushing a button), and wherein the return from true speed readings to indicated speed readings is made automatically.

As has been pointed out above, the pressure effective on the gage element of the air-speed meter is proportional to the square of the velocity, while it is obviously desirable that such meters should have a uniformly divided scale. It is accordingly another object of this invention to provide a meter the scale whereof is divided uniformly over its effective range, but wherein no complicated gearing or linkage mechanism is required to accomplish this result.

Other objects of the invention are:

To provide a meter giving pressure indications which are substantially unaffected by variations in temperature; to provide a meter which is substantially dead beat; and to provide a meter which is simple, rugged, light in weight, and not subject to deterioration or changes of calibration with age and wear.

Other objects of this invention will be apparent or will be specifically pointed out in the description forming a part of this specification, but it is not limited to the embodiment of the invention herein described, as various forms may be adopted within the scope of the claims.

Considered broadly, the air-speed meter of this invention comprises a pressure-indicating element to the input and output sides of which a velocity head is applied by means of a combination Pitot and static head, static and Venturi heads, or any of the other devices known to the art for applying such a pressure differential, and a leak is provided across the indicating element, either as an integral part thereof, or else a by-pass, depending on the type of element used. Included in one of the supply lines leading to said pressure-applying means there is a valve which is operated by means responsive to the factors of temperature and pressure which affect air density, and this valve is so proportioned in relation to its movement as imparted by such control means as to vary the pressure drop across the pressure-indicating element, making this drop a proportion of the total available velocity head varying inversely with the density of the air whose speed is to be measured. Means are also preferably provided for normally by-passing this control valve, the by-pass passage being so designed as normally to cause the indicating element to show the indicated air speed, but being under the control of the pilot so as to switch the compensating valve into the line when desired.

Although any type of pressure indicator may be used which is provided with a leak passage between the input and output sides thereof (even though such passage may have no function insofar as the pressure-indicating element itself is concerned) it is preferred to use as a pressure indicator a restrained turbine, such as shown in the Bonn Patent No. 1,637,927, and in the Morris C. White Patent No. 2,124,096 and application for U. S. Letters Patent, Serial No. 186,494, filed January 24, 1938, such turbines being modified however by having a roughened periphery of the turbine rotor (whereon the air jet impinges to cause an indication), so that turning moment per unit pressure effective at the jet decreases with increasing rotation of the turbine rotor.

The invention may best be understood by reference to the drawings, wherein Figure 1 shows the meter or pressure-indicating element in front elevation and the Pitot-static head and regulator in longitudinal section;

Figure 2 is a transverse section through both meter and regulating head, the plane of section being indicated by the line 2—2 of Figure 1;

Figure 3 is a developed view of the periphery of the meter rotor;

Figure 4 is an enlarged profile of a needle valve nozzle designed in accordance with this invention; and Figure 5 is a diagrammatic showing of the invention as applied to a conventional type of pressure gage, such as a Bourdon tube or diaphragm gage.

As stated above, the preferred type of gage or pressure-indicating element used in this invention is that shown and described in the Bonn patent and White patents above referred to. In the form preferred for use in combination with this invention, the gage movement is mounted within an airtight case 1, which is of the type generally used in aircraft instruments. Within the case is the meter chassis, comprising a back plate 2, which serves as a support and mounting for three annular plates 3, 4 and 5, the inner diameter of the annuli being slightly larger than the outer diameter of a rotor drum 7. This drum is mounted on a shaft 8, which is pivoted on jewel bearings 9 and 10. The bearing 9 is carried by the back plate 2, while the bearing 10 is, in this case, mounted upon an arm 12 which projects from the outer edge of the meter movement over the dial 13 on its mounting plate 14. The shaft carries a hand 15, and the motion of the rotor drum and hand is restrained by a hair spring 17.

The central opening in the annular plates 3 and 5 is preferably truly circular. The opening in the plate 4 has a slot or recess 18 leading into it, this slot communicating and forming a passage way for the air from a nozzle 19, which is rotatable in a circular hole extending through all three plates. The nozzle aperture may be oriented with respect to the rotor by turning the nozzle with a screw-driver engaging a slot 20.

In order to increase the torque produced by the action of the jet on the rotor drum, this drum is knurled or roughened. Usually, in pressure gages of this type, the knurl is uniform and covers the entire skirt of the drum, but in this case we prefer to taper the knurling in the direction of rotation of the drum in the manner shown in the developed drum skirt illustrated in Figure 3. The effective torque on the rotor is, of course, balanced by the tension of the hairspring 17, and since this tension is directly proportional to rotation the torque will be directly proportional to the rotation of the meter hand. It is desirable to have this rotation directly proportional to the air speed, over as much of the scale as possible, so as to give a uniformly divided scale. The velocity in the jet is proportional to the square root of the pressure drop across the meter, and the torque on the drum is proportional to the square of the velocity of the jet times the effective area against which the jet impinges. The knurling or corrugation on the periphery of the drum increases the proportionality factor enormously, although there is some torque exerted by the jet on the drum, even if its surface be made as nearly as possible perfectly smooth. Neglecting for the moment, however, this torque against the smooth drum, the deflection of the meter will be substantially proportional to velocity if the width of the knurled area be made inversely proportional to the deflection; i. e., if the knurling be tapered hyperbolically. It is obvious that, if an attempt were made to carry a knurling of this form down to zero reading, the drum would have to be infinitely wide, which is, of course, absurd. We therefore prefer to knurl the entire width of the drum for some arbitrary distance, in this case, that proportional to an indicated speed of fifty miles per hour, and from that point on to make the width of the knurling inversely proportional to the deflection. This makes the knurling at an indicated speed of 350 miles per hour one-seventh the width of that at 50 miles per hour.

There will, of course, be an error involved owing to the drag of the jet against the unknurled portion of the rotor, and the amount of this drag will depend in a large degree upon the material of which the rotor is formed and the degree of smoothness or polish of the unknurled portion. This error in true linearity may be taken up by making the scale not truly uniform, or a correction may be applied to the hyperbolic curve by experimenting with the actual material used and narrowing the knurled portion or cutting away the unknurled part. These refinements, however, come within the province of the instrument designer and are all considered to be within the scope of this invention, as is the still cruder expedient of tapering the knurling linearity. For instruments of the highest class a further modification of the width of the roughened portion is made to compensate for the correction factor for the compressibility of the air. Where the meter reads in miles per hour and R is the deflection per mile the width of the knurling at any deflection is corrected by dividing by a factor $$C = R(1 + .43V^2 \times 10^{-6})$$

Connected to the nozzle 19 is a tube 24 which leads, in this case, to the usual Pitot head 25 which is mounted under the nose of the plane or on the wing in accordance with general practice. The static head 27 may be mounted separately, as is frequently done, or, as is here shown, may be formed in a larger tube 27 surrounding the Pitot tube 25. Slots 28 formed in the static head tube 27 some distance back from the orifice of the Pitot tube convey the static pressure to a chamber 29 which is preferably formed in a streamline body 30.

The low pressure or outlet side of the meter is connected to the static head in the chamber 29 by a passage or pipe 32 which has two branches 33 and 34, and may be connected to either branch through a push-button valve. The valve body 35 has two oppositely spaced conical seats 37 and 38, into which the branches 33 and 34 respectively lead. A double-cone valve body 39 is preferably ground into each of these valve seats to make a gas tight closure therewith.

A valve stem 40, carrying a push button 41, passes through a gland or stuffing box 42, and is normally urged into the position shown in Figure 2 by a spring 43 bearing against the collar 44. When in this position the branch passage 34 is closed, and the passage-way from the meter through the pipe 32 opens directly into the passage 33 and thence into the chamber 29 through a needle valve 45, which is set once and for all at the time that the meter is installed and calibrated on the plane.

When the push button 41 is actuated, however, the passage-way 33 is closed, and the passage 34 is open into a second chamber 47 in the stream line body 30, this chamber being separated from the chamber 29 by an airtight partition 48 which carries the seat or nozzle 50 of an automatic needle valve. The stem 51 of this valve is actuated by a "Sylphon bellows" or capsule 52 (similar to an aneroid barometer capsule but not evacuated) which is mounted on a bridge 53 supported by the partition 48. The free side of the bellows carries a stud 54 which is preferably supported on an outboard bearing 55. A yoke 57 secured to the stud 54 embraces the bellows, and upon the yoke is mounted the plunger or needle 51 of the needle valve, so that expansion of the bellows or capsule 52 will open the valve. The chamber within the bellows may be filled with air, but we prefer to use hydrogen or helium because of their high thermal conductivity.

The theory and operation of the device are as follows:

Indicated air-speed, as registered by ordinary air-speed meters, is defined by the equation $$P = \frac{DV^2}{2}\left(1 + \frac{1}{4}\frac{V^2}{a^2} + \cdots\right)$$

where P is the pressure differential between the Pitot and the static head, D is the density of the air, V is the velocity or true air-speed, and $a$ is the velocity of sound in free air. Were air an incompressible fluid, the quantity within the parentheses would become unity. The correction factor for compressibility contains higher order terms, but these are so minor as to be negligible until the air-speed becomes very closely approximate to that of sound. We will first consider only the terms without the parentheses and will note the effect of the correction term later.

It will be noted that the pressure is directly proportional to the density of the air D, and this in turn is a function of the atmospheric pressure Po and the absolute temperature T. These two quantities are independently variable over extremely wide ranges. Present day flying instruments for U. S. Army use are required to be accurate over a range of temperatures from −50° centigrade to +50° centigrade, or from 223 to 323 degrees absolute. The mean value of Po is taken at 760 millimeters of mercury at sea level, but it may vary 30 millimeters or more in either direction. In general, however, the temperature drops as altitude increases, with an average "lapse rate" of from 1.6° centigrade to 2° centigrade per thousand feet up to approximately 36,000 feet.

Aircraft instruments are calibrated to give true readings under the conditions assumed for the "International Standard Atmosphere." This International Standard Atmosphere assumes a ground temperature of 15° centigrade, and a lapse rate of 1.98° centigrade per thousand feet, and conforms quite closely to average conditions. Since the conditions are very seldom "average" it follows that any correction applied to an instrument in view of such International Standard Atmosphere is, in fact, arbitrary.

Considering for the moment, however, International Standard conditions, we find that at sea level the density of the air is 1.226 kilograms per cubic meter, and that at 20,000 feet the density is .653 kilogram per cubic meter. With a plane traveling at the same speed at these two levels, the ratio of pressure between the Pitot and static head will be in the ratio of these two densities, and the indicated air-speed will be in the ratio of their square roots. In other words, indicated air-speed at 20,000 feet will be but 73% of the indicated speed at sea level if the actual speeds are the same.

The principle adopted in the compensated meter of our invention is to calibrate the meter to give true air-speed at some altitude which corresponds substantially to the "service ceiling" on the plane on which the meter is to be installed, and to absorb a certain percentage of the pressure developed at lower levels externally of the gage itself.

It is practical to do this in a simple manner if an actual air flow takes place through the Pitot-static system. When such flow does occur, there will, of course, be a drop in pressure throughout the length of the piping system, but this drop can be made negligible throughout the major portion of the system if the flow is made very small. With the type of meter here described a flow necessarily takes place due to the turbine jet which actuates the meter movement. In practice, however, the jet can be made very small in cross-section in comparison to the area of the Pitot and static tubes themselves. Practically, the cross-section of the jet is made not over one-tenth that of the tubing, and preferably considerably smaller, e. g., the areas are preferably in the ratio of about 100:1 or the diameters in the ratio of 10:1. The frictional loss in the tubing then becomes negligible, although we prefer to take it into consideration as will be described later.

Having, then, a line in which the air is moving very slowly, but which contains two orifices through which it moves at high speed and dissipates its velocity head in turbulence or against the meter rotor after passing through these apertures, the drop across the apertures will be divided substantially inversely as their respective areas. The nozzle 19 and the needle valve 50, 51, conform substantially to these conditions, and hence if the opening of the needle valve in response to the movement of the capsule or bellows 52 be proportioned so that it will absorb a percentage of the velocity head corresponding to the difference in density between the density at the service ceiling and the density of the air in which the plane is actually flying, compensation will have been secured.

The streamline body 30 is mounted externally of the plane so that it will be exposed to the ambient temperature through which the plane is flying, and since the bellows 52 is in that chamber which is exposed directly to the static head, the pressure and temperature to which the bellows are exposed will be very closely that of the surrounding air. If the bellows were without elasticity, and the gas within it were air, the volume of air would therefore be the same as the volume of a like mass of free air and its density would be the same as the free air. In practice, the bellows is made as flexible as possible. We have found that by making its diameter sufficiently large and by filling it with gas under such conditions that the bellows is unstressed, either in compression or tension, at substantially the mean volume of air in which it is designed to work, the actual maximum difference in pressure on the gas within the bellows from that without can be made approximately 25 millimeters of mercury. This means that when the pressure of the external air is a maximum that within the bellows is 25 millimeters of mercury less, due to the tendency of the bellows to expand in this condition, whereas when the pressure without the bellows is a minimum the gas within the bellows is subjected to a pressure 25 millimeters of mercury greater than the external pressure.

The diametral expansion of the bellows is practically nil, and hence the motion of the needle valve is substantially linear with respect to the specific volume of the gas within it.

It will be noted, that although the density of any gas other than air within the bellows or capsule 52 will be different from that of air, as long as it is a true gas its specific volume will vary in precisely the same manner, and since it is its specific volume under definite temperature and pressure conditions which does the actual regulating, it makes little difference what gas is used, although there is an advantage in using the lighter gases such as helium or hydrogen.

In the design of a meter of this character to cover a specific range, minimum density condition is fixed at the service ceiling of the plane. This service ceiling is given in terms of the Standard Atmosphere, and if the temperature be higher than standard or if the barometric pressure be lower the actual maximum altitude at which the plane will fly will be less, whereas if the reverse conditions obtain the plane can reach an absolute altitude which is higher than its so-called service ceiling. Since, however, the same factors affect the altitude which the plane can reach as affect the compensating device of the air-speed meter, we have, for conditions of minimum density, an absolute datum on which to base the computation. In the example here given the service ceiling will be taken as 20,000 feet.

For ground level conditions, however, we have no absolute datum. There are places and occasions where the ground level temperature may fall as low as the minimum temperatures for which air craft instruments are ordinarily calibrated, i. e., —50° C. A choice must therefore be made as to the maximum density conditions for which compensation is to be secured, since if we assume a minimum temperature of —50° C. of the ground the temperature at an indicated altitude of 20,000 feet will usually be nearly 40° lower, and under such extreme temperatures the qualities of metals and other materials may undergo very great changes even though they be chosen for their resistance to change under ordinary temperature fluctuations. We therefore assume an arbitrary maximum density, say that corresponding to a temperature of —30° C. at standard barometer at sea level as our maximum density datum. This density would correspond to between 4,000 and 5,000 feet below sea level under "Standard Atmosphere" conditions.

Although the actual service ceiling may be fixed for any given plane installation, the gage cannot be calibrated directly for such ceiling since some throttling will always occur due to the friction in the lead lines and through the needle valve even though that valve be wide open. The gage is therefore calibrated to read correctly at the service ceiling when it is in series with the wide open needle valve. The gage itself, exclusive of tubing and compensating valve, is therefore calibrated to read correctly at an arbitrary density below that of the service ceiling, say .4500 times Standard sea level density (which latter will hereafter be considered as unity density). At 20,000 feet Standard the density is .5327 times Standard sea level or unity density, and pressure across the gage, unthrottled, will be high in the ratio $$\frac{.5327}{.4500} = 1.1835$$

To make it read correctly, the pressure drop across the gage and that across needle valve and line must be in the ratio 1.000 : 0.1835. Assuming (as is very nearly true) that the entire drop external to the gage takes place across the needle valve, and that the drops are inversely proportional to the cross sectional areas of the gage nozzle and valve, the open area of the valve for minimum density must be $$\frac{1}{0.1835} = 5.45$$

times the effective area of the nozzle. Furthermore, the volume of gas within the capsule will be inversely proportional to its density. As stated above, the actual extension of the capsule is practically linear with volume, and the mass of gas within the capsule is preferably so chosen that the capsule is unstressed at approximately the volume corresponding to the mean of the volumes at the maximum and minimum densities for which the compensator is designed. Under the conditions here assumed, the mean volume would correspond to a density of 0.734 or a specific volume of 1.3625 and the maximum extension of the bellows would be 38%, if the capsule were without elasticity, its maximum compression, of course, being the same. These values are not excessive if the bellows be properly designed. Similar calculations for other standard atmosphere elevations lead to the following tabulation, wherein the subscript $o$ refers to sea-level conditions, S is the volume within the capsule, the subscript $m$ refers to conditions at mean volume and accents refer to the arbitrary "unthrottled" minimum density conditions of $.450 = D^1/D_0$, $S_c$ is the volume of the gas when the stress of the capsule elasticity is added algebraically to the atmospheric pressure $P_b$, which is given in millimeters of mercury in column 6.

| 1 | 2 | 3 | 4 | 5 | 6 | 7 | 8 | 9 |
|---|---|---|---|---|---|---|---|---|
| Elev. ft. | $D/D_0$ | $D/D'$ | $A/A_n$ | $S/S_0$ | $P_b$ m. m. Hg. | $(S/S_m)-1$ | $S_c/S_0$ | Valve motion inches |
| 20,000 | .5327 | 1.1835 | 5.45 | 1.879 | 343 | +0.38 | 1.790 | .228 |
| 15,000 | .6291 | 1.395 | 2.535 | 1.590 | 428 | +0.17 | 1.538 | .165 |
| 10,000 | .7384 | 1.640 | 1.561 | 1.354 | 526 | —0.005 | 1.357 | .120 |
| 5,000 | .8616 | 1.915 | 1.092 | 1.160 | 634 | —0.146 | 1.168 | .073 |
| 0 | 1.000 | 2.221 | .826 | 1.000 | 760 | —0.265 | 1.020 | 0.035 |
| 0 (—30° C.) | 1.1850 | 2.635 | .612 | 0.844 | 760 | —0.38 | 0.878 | 0.000 |

The values in columns 3 to 9 inclusive are to slide-rule accuracy only. Column 4, $A/A_n$, gives the ratio of the aperture of the throttling orifice to the effective aperture of the nozzle. Column 5 gives a value which would be proportional to the volume of the capsule if its elasticity were nil, and column 7 gives the proportional extension or compression of the capsule under like conditions. No very serious error would be involved if the valve were designed by plotting the aperture A against the values taken from column 5. It is preferable, however, to compensate completely under standard atmosphere conditions, and to do this it is necessary to correct for the differential pressure applied to the gas by the elasticity of the capsule itself.

A graphical method of doing this involves plotting the values from column 6 as ordinates against those from column 5 as abscissas. This is the standard atmosphere curve. Through the points on this curve are plotted a series of isothermal curves, and each of these curves is scaled in terms of difference of pressure (positive or negative) from standard atmosphere.

There is next laid out along the axis of abscissas a second scale graduated in terms of the differential pressure applied by the capsule to the gas within it at various degrees of extension or compression, as determined by experiment on the particular type of capsule to be used. This scale will be found to be substantially linear with variation of volume within the capsule.

Points may now be found on the isothermal curves where their scale readings correspond with their readings on the second scale of abscissas, and a smooth curve through these points will give the values for capsule extension or needle valve movement at the various elevations shown on the standard atmosphere curve where the isothermal curves intersect it. The values given in column 8 are obtained in this manner for a capsule whose movement was linear with differential pressure, and which gave a maximum differential pressure of 25 millimeters of mercury, with an actual motion of the bellows and valve needle of 0.125", and Fig. 4 shows an enlarged scale half cross sectional profile of the aperture of the valve seat as designed in accordance with these data, the diameter of the needle being taken as 0.1500, and the equivalent aperture of the nozzle being 0.0625".

With a needle valve accurately designed in accordance with the tabulation shown, the compensation for standard conditions may be made as accurate as workmanship permits. There will, however, remain certain fundamental errors, and hence it remains to show that these errors are negligible.

The most important of these errors are those due to maximum deviation of temperatures from standard as these affect the ratio of throttling to density, and the effect of this error is most pronounced at the minimum density condition with temperatures much higher or lower than normal. The conditions for maximum expansion of the capsule have been taken as an elevation of 20,000 feet standard, and this corresponds to a pressure of 349.5 millimeters of mercury. The gas in the capsule may be assumed to be subjected to a pressure of an additional 25 millimeters of mercury owing to the elasticity of the capsule, or a total pressure of 374.5 millimeters. The temperature corresponding to this altitude standard is —24.6 centigrade. If we assume the external temperature 35° higher, corresponding to a ground temperature of +50°, the pressure on the gas to maintain it at the same volume would be 426 millimeters of mercury, of which 25 millimeters would be supplied by the bellows and the pressure of the outside gas would be 401 millimeters. The density of gas at this pressure and temperature is .537 times standard, while the compensation applied would be for a density of .5327. This would involve an error of only 1% in density correction or approximately ½% in velocity correction.

Similar computation for conditions of maximum elevation at a temperature of —50° C. indicate that the compensation would correct to within 1%.

It remains to be shown that the correction factor due to the compressibility of the air will be properly taken care of at minimum densities and maximum velocities. It will be apparent that if the meter scale be properly calibrated to meet the formula at sea level conditions, the correction will be correct at all densities if the speed of sound remain constant with density, and the error if any will depend upon the variation of this factor with pressure and temperature. Computation shows that at constant temperature the speed of sound is not affected by pressure, but varies as the square root of absolute temperature. Under standard sea level conditions this speed may be taken at 741 M. P. H. The total variations between —50° C. and +50° C. is from 651 M. P. H. to 850 M. P. H. At an air-speed of 350 M. P. H. this involves a maximum error in the indication of less than 1%. This error is also uncompensated for in reducing indicated air-speed to true air-speed by the ordinary methods of computation.

In designing the needle valve to accomplish compensations in accordance with this invention, it is, of course, necessary to take account of any nonlinearity of motion with respect to volume of the gas contained within the metal bellows. It is preferred, because of simplicity, to operate the needle valve directly from the bellows without intervening multiplying systems. Any desired amplitude of motion may be obtained by increasing or decreasing the length and number of corrugations on the bellows by increasing the diameter of the bellows, or by using a plurality of capsules in series, as is done in barograph construction.

While the compensating mechanism has been described as being subjected to the pressure of the static head, and on the exhaust side of the gage, this is not an essential feature of the invention. Compensation which is nearly as accurate, if not quite as convenient, may be obtained by applying the principles herein set forth to a design wherein the compensator is subjected to the Pitot pressure instead of the pressure of the static head. A corollary of this fact is that the system may be used with any means of securing the velocity head, such as the Venturi or Pitot-Venturi combinations well known in the art.

In cases where extremes of temperature are not encountered, it would also obviously be possible to place the compensating mechanism directly in the meter case, the only reason for placing it in the air stream being to assure temperature equalization.

Mention has already been made of the needle valve 45 in the branch line 34. The function of this valve is to calibrate the meter to read normally in "indicated air-speed" as shown by the usual uncompensated meter. In order to do this the valve 45 is set to give an orifice which will be equal to that given by the compensator at Standard sea-level density, and the valve when thus set is preferably sealed in such manner as to prevent any change in setting.

Throughout the discussion of the compensation method here described it has been assumed that the pressure drops are inversely proportional to the areas of the respective orifices of the nozzle and compensating valve. This is approximately but not strictly true. Reference has already been made to the "effective" area or cross-section being the area of a simple orifice in a wall that will cause a like pressure drop when passing a like volume of air of like density. The proportionality coefficient for any design of meter can be found only by experiment, the factors which affect it being too complex to compute. Similarly there will be a coefficient for the needle valve which may or may not be a constant for varying valve aperture, and which may best be determined by experiment. It will be found that the theoretical values here shown will not be greatly changed, the method of computation having been expounded thus in detail to show quantitatively the degree of compensation that may be obtained.

Where the instruments are accurately made the readings of the device will give the true airspeed as accurately as it can be computed by the best methods, and much more accurately than it can be obtained by the approximate formulas in general use.

The use of conventional types of pressure indicating elements instead of the restrained turbine has already been mentioned. The most familiar of such gages is probably the Bourdon tube gage, but where high sensitivity is required, as in air-speed meters, the capsule or diaphragm type is more satisfactory. In neither case is there any leak between the input and output, or high and low pressure sides of the gage. Hence when it is desired to use a gage of this type the system must be modified somewhat as shown in Fig. 5, where the meter 70 is of standard construction. The leak is provided by a bypass 71 containing a needle valve 72 for adjusting the flow therethrough, the bypass connecting the lead 24' from the pitot and the lead 32' from the static head. The other elements of the system may be the same as those already described, and are distinguished in the drawings by like reference characters modified by accents. The Pitot and static heads are, however, shown as separated instead of coaxial. It is to be understood, moreover, that in practice the streamlined body 30' would probably seldom if ever be mounted in as close proximity to the Pitot and static heads as is shown in the drawings, for this would probably cause serious vibrational troubles. It is shown as it is merely to indicate that it is outside of the plane in the air stream, where it will be exposed to ambient temperature and pressure.

We claim:

1. A compensated fluid-velocity meter comprising a pressure indicating element having a fluid leak passage between the input and output sides thereof, a conduit for applying the velocity head of the fluid to be measured to the input side of said element, a conduit for applying the static head of said fluid to the output side of said element, a valve in one of said conduits, and means responsive to factors affecting the density of said fluid for actuating said valve to cause a pressure drop therethrough which pressure drop increases with increasing density of said fluid.

2. A compensated fluid-velocity meter comprising a pressure indicating element having a fluid leak passage between the input and output sides thereof, a conduit for applying the velocity head of the fluid to be measured to the input side of said element, a conduit for applying the static head of said fluid to the output side of said element, a valve in one of said conduits, and means responsive to factors affecting the density of said fluid for actuating said valve to cause a pressure drop P' therethrough substantially in accordance with the equation $$P' = \frac{D-D'}{D} P$$

where P is the velocity head, D is the actual density of the fluid, and D' is an arbitrary minimum density of said fluid for which said meter is calibrated.

3. A compensated fluid-velocity meter comprising a pressure indicating element having a fluid leak passage between the input and output sides thereof, a conduit for applying the velocity head of the fluid to be measured to the input side of said element, a conduit for applying the static head of said fluid to the output side of said element, a valve in one of said conduits, a sealed bellows containing a fluid of the character to be metered and exposed to said fluid and connected to actuate said valve.

4. A compensated fluid-velocity meter comprising a pressure indicating element having a fluid leak passage between the input and output sides thereof, a conduit for applying the velocity head of the fluid to be measured to the input side of said element, a conduit for applying the static head of said fluid to the output side of said element, a valve in one of said conduits, a sealed bellows containing a fluid of the character to be metered and exposed to said fluid and connected to actuate said valve to cause a pressure drop P' therethrough substantially in accordance with the equation $$P' = \frac{D-D'}{D} P$$

where P is the velocity head, D is the actual density of the fluid, and D' is an arbitrarily minimum density of said fluid for which said meter is calibrated.

5. An air speed meter comprising a pressure indicating element calibrated to read true air speeds when the velocity head due to air at a predetermined minimum density is applied thereto, means for applying a portion of a velocity head to said element, a sealed expansible chamber containing a gas and exposed to the air whose speed is to be measured, and means responsive to changes in volume of said chamber for varying said portion of the velocity head substantially in the ratio of said minimum density to the density of the air whose speed is to be measured.

6. A compensated air-speed meter comprising a pressure indicating element having an air passage between the high pressure and low pressure sides thereof, a pair of conduits for applying a differential pressure due to air speed to said indicating element, one of said conduits comprising two branches, a valve in one of said branches responsive to factors affecting the density of the air whose speed is to be measured, and a manually operated valve for connecting either of said branches to said indicating element.

7. A compensated air-speed meter comprising a pressure indicating element having an air passage between the high pressure and low pressure sides thereof, a pair of conduits for applying a differential pressure due to air speed to said indicating element, one of said conduits comprising two branches, a valve in one of said branches responsive to factors affecting the density of the air whose speed is to be measured, a constriction in the other branch of said conduit, and valve means for connecting either one or the other of said branches in series with said indicating element.

8. A compensated air-speed meter comprising an indicating element, said indicating element comprising a turbine rotor, a spring for resiliently restraining motion of said rotor, and a nozzle for projecting an air jet against said rotor, intake and exhaust passages to said nozzle and from said indicating element respectively, means for applying a velocity head due to air-speed to said passages, an orifice in one of said passages for producing a pressure drop therein, and means responsive to the density of air whose speed is to be measured for varying said orifice, whereby the portion of the velocity head effective across said nozzle is regulated to produce an indication of air speed which is substantially independent of the density of said air.

9. A compensated air-speed meter comprising an indicating element, said indicating element comprising a turbine rotor, a nozzle for projecting an air jet against said rotor, a spring for resiliently restraining motion of said rotor, and said rotor having an active surface presented to said jet which varies in width as an inverse function of the rotation of said rotor against said spring, intake and exhaust passages to said nozzle and from said indicating element respectively, and a valve in one of said passages responsive to factors affecting the air whose speed is to be measured, said valve being connected to open with decreased density.

10. A compensated air-speed meter comprising an indicating element, said indicating element comprising a turbine rotor, a nozzle for projecting an air jet against said rotor, a spring for resiliently restraining motion of said rotor, and said rotor having an active surface presented to said jet which varies in width as an inverse function of the rotation of said rotor against said spring, intake and exhaust passages to said nozzle and from said indicating element respectively, a valve in one of said passages and means for operating said valve comprising an expansible chamber containing a fixed mass of gas and exposed to the temperature and pressure of the air whose speed is to be measured.

11. A compensated air-speed meter comprising an indicating element, said indicating element comprising a turbine rotor, a nozzle for projecting an air jet against said rotor, a spring for resiliently restraining motion of said rotor, and said rotor having an active surface presented to said jet which varies in width as an inverse function of the rotation of said rotor against said spring, intake and exhaust passages to said nozzle and from said indicating element respectively, a valve in one of said passages and means for operating said valve comprising an expansible chamber containing a fixed mass of gas and exposed to the temperature and pressure of the air whose speed is to be measured, and manually operated means for by-passing said valve and preventing passage of air therethrough.

12. A compensated air-speed meter comprising an indicating element, said indicating element comprising a turbine rotor, a nozzle for projecting an air jet against said rotor, a spring for resiliently restraining motion of said rotor, and said rotor having an active surface presented to said jet which varies in width as an inverse function of the rotation of said rotor against said spring, intake and exhaust passages to said nozzle and from said indicating element respectively, a valve in one of said passages and means for operating said valve comprising an expansible chamber containing a fixed mass of gas and exposed to the temperature and pressure of the air whose speed is to be measured, means for by-passing said valve and preventing passage of air therethrough, and manual means for rendering said by-passing means temporarily inoperative.

DONALD K. LIPPINCOTT.
MORRIS C. WHITE.